United States Patent [19]
Boroshok

[11] 3,753,732
[45] Aug. 21, 1973

[54] RAPIDLY DISINTEGRATING BAKERY ENRICHMENT WAFER

[75] Inventor: Melvin J. Boroshok, Yonkers, N.Y.

[73] Assignee: Merck & Co., Inc., Rahway, N.J.

[22] Filed: Apr. 19, 1971

[21] Appl. No.: 135,480

[52] U.S. Cl. .......................... 99/91, 99/1, 99/DIG. 4
[51] Int. Cl. ............................ A21d 2/00, A23l 1/30
[58] Field of Search ...................... 99/91, DIG. 4, 1; 127/29

[56] References Cited
UNITED STATES PATENTS

| | | | |
|---|---|---|---|
| 2,470,804 | 5/1949 | Clark | 99/91 X |
| 3,034,911 | 5/1962 | McKee et al. | 99/DIG. 4 |

Primary Examiner—Raymond N. Jones
Assistant Examiner—James Robert Hoffman
Attorney—Raymond Underwood, Harry E. Westlake, Jr. and I. Louis Wolk

[57] ABSTRACT

A hard, non-fragile enrichment wafer which nevertheless disintegrates quickly in water is made by adding a portion of the starch to the nutrients, compressing the mixture into tablets, comminuting the tablets, then adding the remainder of the starch to the comminuted tablets, mixing and recompressing into wafers.

3 Claims, No Drawings

RAPIDLY DISINTEGRATING BAKERY ENRICHMENT WAFER

This invention relates to a nutrient containing wafer for the enrichment of bakery products such as breads, buns, rolls, pastries, cakes and cake fillers.

It is a common practice to add these enrichment wafers to bakery doughs and the usual practice is either to (*a*) add them directly to the dough so that they will be intimately mixed throughout the dough or to (*b*) add them to an amount of water in a separate container so that the wafer will be dispersed therein and to then add this dispersion to the dough so that it will be distributed more quickly. In either practice, it is important that the wafers disintegrate as soon as possible to thereby hasten its distribution throughout the dough.

This rapid disintegration of the wafer could, of course, be achieved if it is made as a fragile structure but such a weak wafer will not withstand ordinary shipping and handling. It has been found that if the wafer is compressed hard enough to make it sufficiently strong to sustain shocks it has a very slow disintegration rate. Past practices, therefore, have tried to arrive at a medial position between the conflicting aspects of a too hard wafer which disintegrates too slowly and a fragile wafer which disintegrates in the desired short time.

The present invention involves the discovery that a hard, shock resistant wafer can be made as a rapidly disintegrating one if the starch used in making it is divided and added at two separate stages. Especial advantages are found to occur if the starches which are separately added are of different kinds, namely a pregelatinized starch such as that of tapioca starch and a non-pregelatinized starch such as ordinary corn starch. Both of these starches are obtainable commercially. The nutrients which are to be present in the wafer are the usual vitamins and minerals such as riboflavin, thiamine or one of its nutritionally acceptable salts such as the mononitrate, niacin or a derivative such as niacinamide, and iron such as ferrous sulfate. A tableting lubricant such as calcium stearate is also preferably added.

In practicing the invention the selected vitamins and minerals and the pregelatinized starch are first thoroughly blended together using a conventional mixing or blending machine. A lubricant such as calcium stearate is preferably included in the mix. The product is then directly compressed into wafers and the hardness is immaterial as long as the wafers are fully formed and can be handled without immediate breakage. These wafers are then broken up and are comminuted or reduced through a sieve which can vary from a No. 6 to No. 30 mesh size. To this granular material is added the non-pregelatinized starch and additional lubricant such as calcium stearate. After thorough blending this preparation is tableted into wafers.

It is important to note that two different starches are added at successive stages. Best results are obtained if the pregelatinized starch, is added to the vitamins and the non-pregelatinized starch is subsequently added. The invention may be practiced however, if the two starches are interchanged but best results are obtained if the pregelatinized starch is added first.

The total amount of starch to be added is that which is conventionally used in the wafers, i.e., it should add up to about 25–60 percent, preferably 40 percent of the weight of the wafer. The pregelatinized starch which is added to the vitamin-mineral premix should constitute from 15 to 35 percent by weight of that premix. The cornstarch added at the final stage should constitute from 10 to 25 percent of the final granular material to be compressed into the final wafer.

Representative examples are the following:

EXAMPLE 1

I. Formula

| Ingredients | per tablet mg. | Quantity per 100 tablets g. |
|---|---|---|
| 1. Riboflavin | 105 | 10.5 |
| 2. Thiamine mononitrate | 155.8 | 15.58 |
| 3. Ferrous sulfate | 2962.0 | 296.2 |
| 4. Niacin | 1248.0 | 124.8 |
| 5. Tapioca starch (pregelatinized) | 1500.0 | 150.0 |
| 6. Calcium Stearate | 0.3 | 0.30 |
| sub total | 5971.1 | 597.11 |

II Process

A. In a seven quart Hobart mixer bowl, blend (2), (3), and (4).
B. Add (1) to above and continue to blend. Add (6).
C. Pass through a No. 28 mesh screen.
D. Add (5) to above screened blend, and blend in Hobart mixer.
E. Compress on a Manesty single punch press equipped with 24/32 inch set of tooling.
F. Pass wafers through a No. 12 guage sieve.
G. Combine:

| | |
|---|---|
| Product F. blend | 542.0 g. |
| Corn starch | 102.0 g. |
| Ca. stearate | 2.0 g. |
| Total | 646.0 g. |

This was thoroughly blended and again compressed as above. There was no evidence of build-up on tablets. They disintegrated in 45 seconds at room temperature water. They had a hardness of 7 kg. on a Strong Cobb hardness testor.

EXAMPLE 2

This shows that the combined addition of the two starches results in a slowly disintegrating wafer.

I. Formula

| Ingredient | Quantity per 100 wafers g. |
|---|---|
| 1. Ferrous sulfate | 292.20 |
| 2. Riboflavin U.S.P. | 10.50 |
| 3. Niacin | 124.80 |
| 4. Thiamine mononitrate U.S.P. | 15.58 |
| 5. Tapioca starch (pregelatinized) | 150.00 |
| 6. Corn starch | 40.00 |
| 7. Calcium stearate | 3.00 |
| | 640.00 |

II. Process

A. In the 7 quart Hobart bowl, add (1) and (2) and blend.
B. Add (3) and (4) to above and blend.
C. Add (5) and blend.
D. Pass above blend through a No. 28 mesh screen and reblend in the Hobart.
E. Add (6) and blend. Then add (7) and blend.
F. Compress on a Manesty single punch press equipped with a 24/32 inch set of tooling.

III. Compression

Firm tablets were compressed. Filming was present on upper and lower punch. Disintegration in room temperature water extended beyond 3 minutes. Tablets had a mottled appearance.

EXAMPLE 3

Example 1 is carried out but instead of the tapioca starch there is substituted another pregelatinized starch such as of corn, wheat, potato or rice.

EXAMPLE 4

Example 1 is carried out but instead of the corn starch there is substituted another non-pregelatinized starch such as of tapioca, wheat, potato or rice. The varations here mentioned can be combined with the variations mentioned in Example 3.

EXAMPLE 5

Instead of the amounts of starch mentioned in Example 1 at both stages of addition, the amount used may be varied within the ranges stated above for both stages. This applies as well if the starch selected is one of those mentioned in Examples 3 and 4.

EXAMPLE 6

In Example 1, the corn starch or other non-pregelatinized starch may be added first and the tapioca or other pregelatinized starch may be added subsequently. This also applies if the starches of Examples 3 and 4 are substituted.

EXAMPLE 7

Certain vitamins and an iron salt are named in Example 1 but one or two may be omitted or others may be added as the feature of the invention is the two stage addition of the starches.

In practicing the invention, the pressure applied in forming the final wafer after the two-stage addition of the starches lends itself to the formation of a fairly hard wafer without impairing its quick disintegration in water. In most instances a hardness is readily established which will result in a complete disintegration in water within 1 minute but the invention contemplates a greater hardness which will nevertheless result in a 2 minute disintegration time. This is in contrast with the over 3 minute interval mentioned in Example 2. This demonstrates the importance of the initial wafer formation, its comminution and a second stage addition of starch thereto.

The wafers will have such physical hardness that upon ordinary handling they will not chip, crack or powder. They will fully disintegrate in water, without stirring, in less than 2 minutes and after slight stirring all or nearly all of the tablet will be suspended and pour out of the container.

What is claimed is:

1. The process for making a bakery enrichment wafer containing nutrient vitamins and minerals and starch in an amount of from 25 to 60 percent by weight based on the weight of the wafer, said starch comprising pregelatinized starch in an amount of 15–35 percent by weight based on the weight of the wafer and non-pregelatinized starch in an amount of 10–25 percent by weight based on the weight of the wafer, which comprises mixing said pregelatinized starch with the selected nutrients to form a premix, passing the premix through a screen, compressing the screened premix material in tablet form, comminuting the tablets through a screen, mixing the comminuted material with said non-pregelatinized starch, and recompressing into wafer form.

2. The process according to claim 1 in which the first starch addition is tapioca starch and the second addition is of corn starch.

3. The bakery enrichment wafer made by the process of claim 1 which is hard, resistant to fracture and chipping and which fully disintegrates in water at room temperature within 2 minutes.

* * * * *